A. C. BECKWITH.
HYDROSTATIC LUBRICATOR AND VALVE MECHANISM THEREFOR.
APPLICATION FILED JUNE 13, 1918.

1,302,285.

Patented Apr. 29, 1919.
3 SHEETS—SHEET 1.

Witnesses:
Harry B. C. White
W. F. Kilroy

Inventor:
Arthur C. Beckwith
By Hill & Hill Attys.

A. C. BECKWITH.
HYDROSTATIC LUBRICATOR AND VALVE MECHANISM THEREFOR.
APPLICATION FILED JUNE 13, 1918.

1,302,285.

Patented Apr. 29, 1919.
3 SHEETS—SHEET 3.

UNITED STATES PATENT OFFICE.

ARTHUR C. BECKWITH, OF CHICAGO, ILLINOIS.

HYDROSTATIC LUBRICATOR AND VALVE MECHANISM THEREFOR.

1,302,285.   Specification of Letters Patent.   Patented Apr. 29, 1919.

Application filed June 13, 1918. Serial No. 239,807.

*To all whom it may concern:*

Be it known that I, ARTHUR C. BECKWITH, a citizen of the United States, residing at Chicago, in the county of Cook and State of Illinois, have invented certain new and useful Improvements in Hydrostatic Lubricators and Valve Mechanism Therefor, of which the following is a description.

My invention belongs to that general class of devices known as lubricators, and particularly to the type known as hydrostatic lubricators and valve mechanism for controlling the same. My invention has among its objects the production of a device of the kind described that is simple, convenient, durable, efficient and satisfactory for use wherever found applicable. The device is particularly adapted for locomotive service, but it may of course be used wherever found desirable. The invention has among its further objects the production of a device in which the lubricator feeding is stopped when desired, or when the engine stops, the same operating automatically, stopping when the engine stops and feeding when the engine is running. The invention has particularly as an object the production of a lubricator of the kind described that will not be affected by changes in temperature or pressure, and in which all of its contents that will in any way affect the feed, namely steam, water and oil, may be perfectly balanced, each being balanced independently, steam by steam, water by water and oil by oil, the lubricator being started by throwing one, preferably the water, out of balance. Many other objects, advantages and uses of the device herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts.

Referring to the drawings, in which the preferred form of my device is shown, I provide a casing of suitable size, shape and material, so constructed as to provide condensing chamber D, auxiliary water chamber E, oil reservoir F, expansion chamber K and chamber G. It may be mentioned that while I have shown the casing as of integral construction, this is immaterial, it being understood that the same is constructed in a manner that will be economical and efficient to manufacture and in accordance with the best engineering practice.

Figure 1:
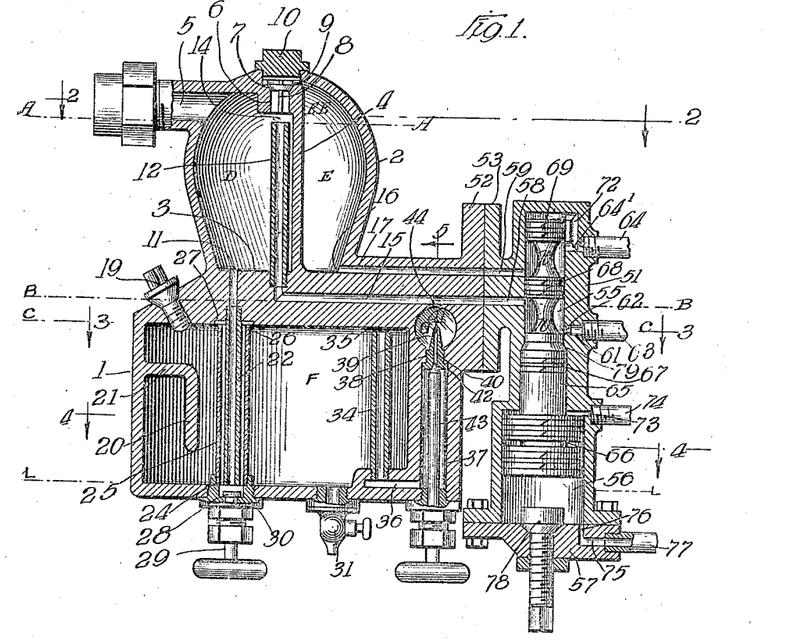
Figure 1 is a sectional view through a form of lubricator embodying my improvements.

Referring to Fig. 1, the casing consists of the lower portion 1 containing the chambers F and K, and a part 2 forming chambers D and E, chambers F, D and E being separated by the partitions 3 and 4, or the equivalent. The part 2 is provided with an inlet 5 arranged to be connected with a steam connection. An opening 6 formed with a valve seat 7 communicates through the opening 9 with chamber E communication between the chambers, however, being controlled by a valve 8 of suitable form arranged to coöperate with the valve seat 7. A closure 10 may be provided which is normally seated and permits insertion, removal or inspection of the valve 8. Within chamber D is a pipe 12 having an opening 13 at the upper part of chamber D, it being understood that it is immaterial whether or not pipe 12 is formed integral with the partition 4 or not. It may be mentioned that the opening 14 in the preferred construction is at the point indicated, to-wit, on line A A level with the bottom of the inlet 5. I also prefer to arrange the valve 8 so that it is directly above the opening 14 (not essential). Pipe 12 communicates with a duct or passage 15, while part 2 is formed with an opening 16 at the bottom of chamber E communicating with a duct or passage 17.

An opening or inlet is provided for chamber F which is normally closed by a closure 19 or equivalent means for the purpose. The casing 1 is provided with a wall 20—21 or the equivalent at the desired point, forming the expansion chamber K, the construction being such that the top 21 is not above and preferably is below the top of chamber F, i. e. at a point below the line or point C. A pipe 22 communicates with the duct or passage 11 from chamber D, this pipe extending to the bottom of chamber F or to a point substantially as indicated at the line L, so that its open end 24 is at the bottom of the chamber. This pipe is surrounded by a return pipe 25, which extends upwardly with its open end 26 substantially flush with the top wall of chamber F, or to the point indicated by line C. In this connection, the partition wall 3 is preferably recessed as at 27, so that the interior of the pipe is in communication with chamber F. I preferably provide a valve 28 which may be controlled by a valve stem 29 with a suitable handle, valve 28 being termed the water valve, the purpose and operation of which will be hereafter explained. For convenience in construction I prefer to use a part 30 which carries the pipe 25 and valve mechanism, stuffing box, etc.

Figure 5:
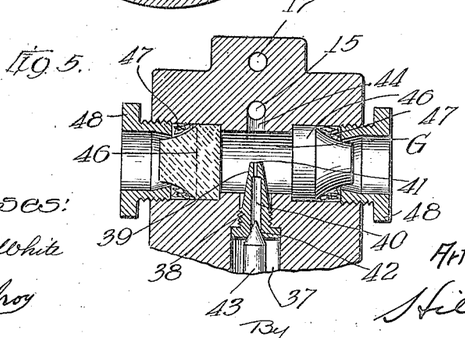
Fig. 5 is a sectional view taken substantially on line 5—5 of Fig. 1.

A drain valve 31 is also provided in the chamber F. Arranged within chamber F is a pipe 34, the upper end of which has an inlet 35 adjacent the top of the chamber F or close to line C C. The interior of the pipe 34, which is the oil pipe, communicates with a duct 36 opening into duct 37, at the end of which is a tip 38, the upper end of which extends into chamber G. The tip 38 is provided with a duct 40 therethrough, having a restricted outlet 41 in chamber G. In the preferred construction the end of the tip is in the plane of the top of chamber F, so that its discharge is substantially at the line C C. I preferably provide a valve 43 arranged to coöperate with the valve 42 so that the oil may be controlled as desired. Chamber G is provided with a duct 44 communicating with the duct or passageway 15. Referring to Fig. 5, chamber G is provided with glass or transparent walls, so that the feed from the tip in chamber G may be observed when desired. In the preferred construction I provide the glass walls 46, which are secured in place and leakage prevented by the packing 47 and tubular locking member 48. Obviously the feeding may be noted as desired by looking through the chamber G.

Figure 2:
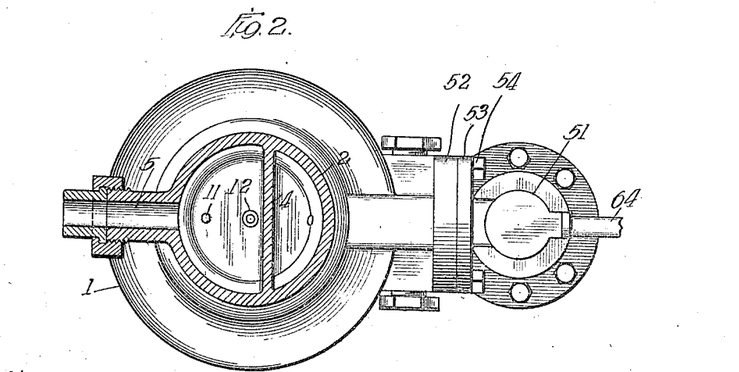
Fig. 2 is a sectional view taken substantially on line 2—2 of Fig. 1.
Figure 3:
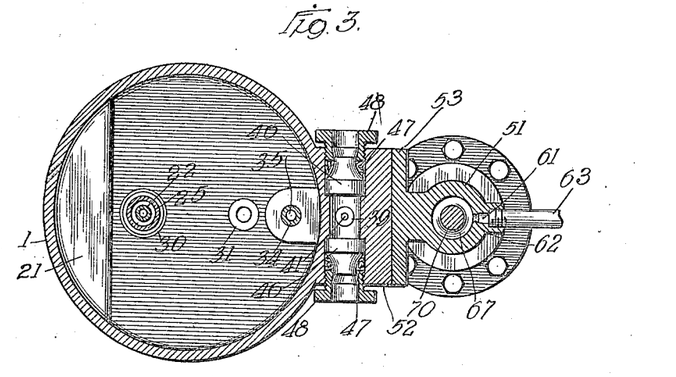
Fig. 3 is a sectional view taken substantially on line 3—3 of Fig. 1.
Figure 4:
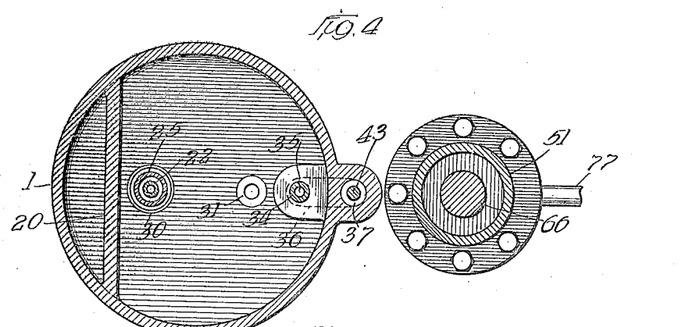
Fig. 4 is a sectional view taken substantially on line 4—4 of Fig. 1.
Figure 6:
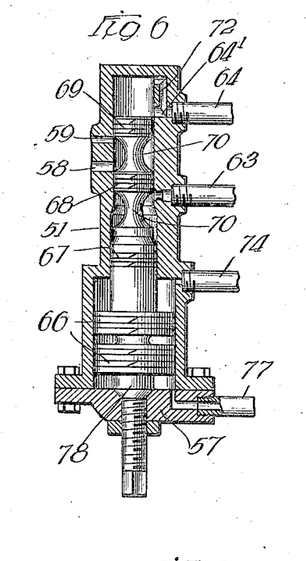
Fig. 6 is a sectional view through the casing 51, similar to Fig. 1, showing the parts in changed positions.

In controlling the feeding I prefer to employ a differential piston valve construction arranged in a casing 51. As shown in Figs. 1 and 6 the casing 51 is separable from the casing parts previously described, the two parts being suitably flanged as at 52—53, and secured together by bolts, the nuts 54 thereon being shown in Figs. 2 and 3. The casing 51 is provided with chambers 55 and 56 therein, and in the preferred construction with a removable head 57 secured in place in any suitable manner. Ducts or passage-ways 58 and 59 connect the ducts 15 and 17 with the chamber 55, and connected with this chamber is the delivery pipe 63 and pipe 64 which has a boiler connection to the water. As most clearly shown in Fig. 1, the discharge port 61 is preferably formed with a choke at 62. By locating the choke as shown, the same permits quick equalization between the chambers D and E, but for this the choke might be arranged in the ducts 15 or 58. Pipe 64 connects with the chamber 55 through the duct 64'. Within the casing 51 is arranged a valve 65, which is provided with the rings 66, 67, 68 and 69, or constructed in any equivalent manner. Between the rings 67, 68 and 69 it will be noted that the valve is reduced as at 70, so as to provide spaces or chambers between the valves. It will be noted that there is a space at the end 69 of the piston which is connected by duct 72 with the duct 64'. I also provide a drain port 73, which is connected by pipe 74 to where desired. In the chamber 56 I provide a port 75 which is preferably restricted or choked at 76, 77 being a pipe connected with a suitable motive agent, as for example compressed air. 78 is a valve stop and manually operable means for the valve 65. The casing is preferably formed as at 79 so as to provide a stop for the valve when moving in the opposite direction. It is also a valve seat supplementing rings 67.

The operation of the apparatus may be briefly described as follows:—Assuming that inlet 5 is connected with a source of steam supply so that steam at boiler pressure may be admitted to chamber D, and that valve 43 is set as desired, pipe 64 is connected with the boiler so that the boiler water at boiler pressure may be admitted therethrough. Pipe 63 is a feed pipe or delivery connection through which the oil is discharged as desired to the desired point. Drain pipe 74 is connected to where desired and pipe 77 to a motive agent such as compressed air. Oil is in the oil reservoir E, having been placed therein through the opening normally closed by the plug 19, and the same is in pipe 34, duct 36, duct 37, duct 40 and 41. The water in chamber D fills the chamber to the line A A, any surplus flowing back through the steam inlet 5 by gravity when the lubricator is not in operation, otherwise it goes through pipe 12. The water fills duct 11, pipe 22 and pipe 25. There is also water in chamber E, duct 17 and 59, and steam in the upper part of chamber D, pipe 12, duct 15 and 58. It may be assumed that valve 65 is in the position shown in Fig. 1, in which case the lubricator is feeding oil to where desired. Assuming that the boiler pressure is X pounds, then there will be X pounds pressure in duct 15 at the duct 44, and X pressure being exerted on the water in chamber D, there will then be X pounds pressure on the water in the pipe 22 plus the additional pressure due to the head or column of water between lines A and B. Owing to this overbalanced pressure the oil will therefore be discharged through duct 44 into 15 by virtue of the head of water between lines A and B, and will be carried by the steam pressure through duct 58 and into the space between the rings 67 and 68, through the choke 62, duct 61 and pipe 63 to the point to be lubricated. Valve 65 will be maintained in position against the stop 79 by the pressure in chamber 56. When the engine is stopped the compressed air is released from chamber 56 through the ducts 76, 75 and pipe 77, the water boiler pressure in duct 64' and 72 acting at the opposite end of the valve, will remove the valve 65 against the stop 78, and ducts 58 and 59 are connected through the space between rings 68 and 69. In this case the delivery through 63 is closed, as is also the water connection 64', except through duct 72, no water being admitted from 64' to the duct 59. When the valve is in this position the feeding of the lubricator is stopped, as the equalizing pipe 12 is filled with water from chamber E to the point A, thus balancing and causing to be nil the working pressure that is due to the head of water in D, that is between the lines A and B. The space E E in chamber E above the line A is designed to hold enough water to fill the equalizing pipe 12 and duct 15 full to the line A. This level will be maintained by reason of the fact that the steam connection at 5 is located to carry off any surplus water in D to the boiler. Steam from D enters E in this position past the check valve 8, causing a quick and even balance. Also in this position a perfect steam balance is obtained by reason of closing the delivery at 63, holding all steam in the lubricator.

It will thus be seen from the preceding that there is an independent oil, water and steam balance, and that the top line of oil in chamber F is definitely established and will not change or vary with the changes in temperature and pressure in the lubricator. The highest line of oil in F will be on the line C at all times, regardless of the pressure and temperature in the lubricator. The water for oil displacement in F is on the line C, thus balancing the water that is contained in the pipe 22, the water in pipe 22 and 25 balancing each other between lines C and L. The delivered water will pass through the oil by the force of gravity. The oil from F is delivered to pipe 34 substantially on the line C, the head being line C, and the top of feed tip 41 being on line C in chamber G when the feed pipe and valve 43 is open the oil in pipe 34 and in ducts 37, 40 and 41 is balanced. Thus it will be seen that by the combination of definitely establishing the top line of oil in F on the line C by admitting the water for oil displacement into F on the line C, and by delivering the oil from F on the line C in G, the pressure that is due to the head of the contents in F is rendered negative at 42 for influencing the oil feed when the valve is closed. It will be noted that the water column between the lines B B and C C in G and 44 is opposed by the column of water in pipe 22 and duct 11 that is between the lines B and C. Thus it will be seen that between the lines B and L both water and oil are balanced, excepting the contents of F, and the pressure that is due to the head of the contents in F is caused by this to be negative at 42, and thus it will now be clear that the effective pressure at 42 is wholly due to the head of water in D between the lines A and B. It will be noted that the check valve 8 permits a quick establishing of a water level between the two chambers D and E when they are connected, and to prevent water from E entering D when they are not connected. Both chambers D and E have boiler pressure, D being connected to steam and E to water. Steam from D entering E causes a quick and even balance, and when the valve is in the position whereby ducts 58 and 59 are connected, a perfect steam balance is obtained, all steam being held in the lubricator. When the device is applied on a locomotive and the train stops or stands, for example as at stations, etc., feeding of the lubricant is automatically stopped. The automatic control mechanism for the valve 65, however, is not shown herein, but in a separate application. It will be particularly noted that while the oil and water in reservoir F has a variable head or weight as the oil decreases and the water increases, this variable head is in no way effective on the feeding of the lubricant in view of the balance referred to. The only effect of throwing the water out of balance, as described, is to cause a head and causes the feeding.

Figure 7:
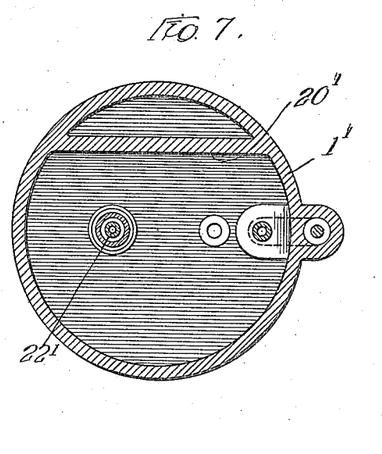
Fig. 7 is a sectional view corresponding to a portion of Fig. 4, showing a slightly modified arrangement of the expansion chamber.
Figure 8:
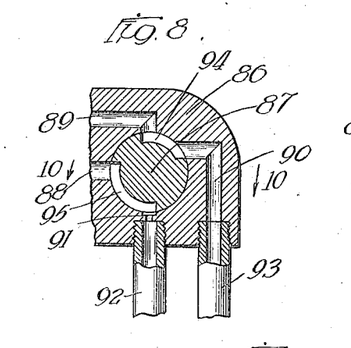
Fig. 8 is a sectional view taken substantially on line 8—8 of Fig. 10, illustrating a simple manually operable controlling valve.
Figure 9:
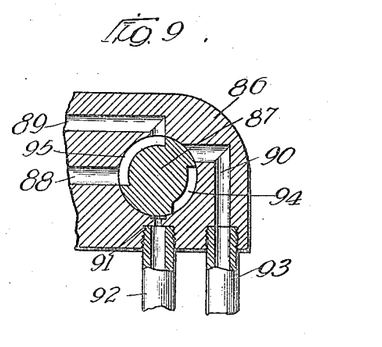
Fig. 9 is a similar view showing the valve member in changed position.
Figure 10:
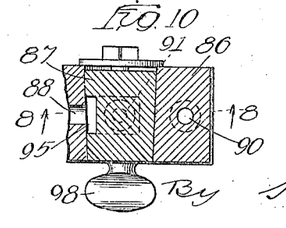
Fig. 10 is a sectional view taken substantially on line 10—10 of Fig. 8.

In Fig. 7 the partition 20' is arranged at one side, changing the location of the expansion chamber. Obviously the result is not affected. In the modified construction of valve mechanism shown in Figs. 8 to 10, 86 represents a part corresponding to part 51, which is provided with a valve 87 corresponding with the valve 65. Part 86 is provided with ducts 88 and 89 corresponding with ducts 58 and 59, and with ducts 90 and 91 corresponding with 64' and 61, pipes 92 and 93 corresponding with pipes 63 and 64. As shown, 91 also represents the choke. The valve is shown with recesses 94 and 95. I have shown an operating handle 98 for the valve 87, it being understood that this is merely illustrative. The position of the valve shown in Fig. 8 corresponds to the position of valve 65 shown in Fig. 1, while in Fig. 9 it corresponds with the valve as shown in Fig. 6. The operation is similar in so far as results are concerned, the only difference being that a manually operable valve is shown instead of an automatically or fluid controlled valve.

Expansion chambers have been employed before, but locating the expansion chamber K at a point where it will not influence the oil feed, is, I believe, new with me. The function of the expansion chamber K is to provide an air trap so that when filling the oil reservoir all the space cannot be filled with oil, thus permitting an air cushion whereby the heating of the oil will not tend to rupture the oil reservoir or interfere with the operation of the device.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a lubricator of the kind described and in combination, suitable chambered parts constructed to provide an oil reservoir, a condensing chamber and a water chamber, said parts provided with communicating ducts between said chambers, and with a steam inlet to the condensing chamber and with an oil and steam outlet, and means for controlling the discharge of oil from said lubricator.

2. In a lubricator of the kind described and in combination, suitable chambered parts constructed to provide an oil reservoir and expansion chamber, a condensing chamber and a water chamber, said parts provided with communicating ducts between said chambers, and with a steam inlet to the condensing chamber and with an oil and steam outlet, said ducts and outlets so disposed as to provide a balanced head of water and oil in the oil reservoir.

3. In a lubricator of the kind described and in combination, suitable chambered parts constructed to provide an oil reservoir, a condensing chamber and a water chamber, said parts having a steam inlet and steam outlet from said condensing chamber and with an outlet from said oil reservoir communicating with said steam outlet, said oil outlet so disposed that variable heads of water and oil in the oil reservoir are not effective on the passage of oil through said outlet.

4. In a lubricator of the kind described and in combination, suitable chambered parts constructed to provide an oil reservoir, a condensing chamber and a water chamber, said parts having a steam inlet and steam outlet from said condensing chamber and with an outlet from said oil reservoir communicating with said steam outlet, said steam inlet port and outlet port to and from the condensing chamber being substantially on a level, said oil outlet so disposed that variable head of water and oil in the oil reservoir are not effective on the passage of oil through said outlet.

5. A lubricator of the kind described and in combination, suitable chambered parts constructed to provide an oil reservoir, a condensing chamber and a water chamber, said parts having a steam inlet and steam outlet from said condensing chamber and with an outlet from said oil reservoir communicating with said steam outlet, said oil outlet so disposed that variable heads of water and oil in the oil reservoir are not effective on the passage of oil through said outlet, and means for controlling the passage of oil and steam from the lubricator, and passage of water from the water to the condensing chamber.

6. In a lubricator of the kind described and in combination, a casing provided with an oil reservoir having a discharge port and a nozzle connected therewith, said reservoir and nozzle so arranged that the oil is balanced between the reservoir and nozzle, a condensing chamber provided with a discharge outlet, said nozzle arranged to discharge into said outlet, and means for connecting said chamber and reservoir whereby the water is admitted from said chamber to displace the discharged oil, and the oil discharged from said nozzle is under a constant head of water from said condensing chamber, and a valve for controlling the passage of oil through said outlet from said condensing chamber.

7. In a lubricator of the kind described and in combination, a casing provided with an oil reservoir having a discharge port and a nozzle connected therewith, said reservoir and nozzle so arranged that the oil is balanced between the reservoir and nozzle, a condensing chamber provided with a discharge outlet, said nozzle arranged to discharge into said outlet, and means for connecting said chamber and reservoir whereby the water is admitted from said chamber to displace the discharged oil, and the oil discharged from said nozzle is under a constant head of water from said condensing chamber, a valve for controlling the passage of oil through said outlet from said condensing chamber, and means controlled by said valve for balancing the head of water in said condensing water when said valve is in position to prevent the normal discharge of oil from the casing.

8. In a lubricator of the kind described and in combination, a casing provided with an oil reservoir having a discharge port and a nozzle connected therewith, said reservoir and nozzle so arranged that the oil is balanced between the reservoir and nozzle, a condensing chamber provided with a discharge outlet, said nozzle arranged to discharge into said outlet, and means for connecting said chamber and reservoir whereby the water is admitted from said chamber to displace the discharged oil, and the oil discharged from said nozzle is under a constant head of water from said condensing chamber, a pressure controlled valve for controlling the passage of oil through said outlet from said condensing chamber, and means controlled by said valve for balancing the head of water in said condensing water when said valve is in position to prevent the normal discharge of oil from the casing.

9. A lubricator of the kind described comprising the combination of a chambered part having an oil chamber, a condensing chamber having a steam inlet and arranged above the oil chamber, means for connecting said condensing chamber and oil chamber whereby the head of water in the oil chamber is ineffective on the discharge of oil, an outlet from said oil chamber having a discharge nozzle adjacent the top of the oil chamber, said outlet so arranged that the head of oil in said oil chamber is ineffective to cause the discharge of oil through said nozzle, said condensing chamber provided with an outlet, said nozzle arranged to discharge oil into said outlet, a valve for controlling the discharge of steam and oil from said condensing chamber outlet.

10. A lubricator of the kind described comprising the combination of a chambered part having an oil chamber, an expansion chamber communicating therewith and arranged below the top of the oil chamber, a condensing chamber having a steam inlet and arranged above the oil chamber, means for connecting said condensing chamber and oil chamber whereby the head of water in the oil chamber is ineffective on the discharge of oil, an outlet from said oil chamber having a discharge nozzle adjacent the top of the oil chamber, said outlet so arranged that the head of oil in said oil chamber is ineffective to cause the discharge of oil through said nozzle, said condensing chamber provided with an outlet, said nozzle arranged to discharge oil into said outlet, a valve for controlling the discharge of steam and oil from said condensing chamber outlet.

11. A lubricator of the kind described comprising the combination of a chambered part having an oil chamber, a condensing chamber having a steam inlet and arranged above the oil chamber, means for connecting said condensing chamber and oil chamber whereby the head of water in the oil chamber is ineffective on the discharge of oil, an outlet from said oil chamber having a discharge nozzle adjacent the top of the oil chamber, said outlet so arranged that the head of oil in said oil chamber is ineffective to cause the discharge of oil through said nozzle, said condensing chamber provided with an outlet, said nozzle arranged to discharge oil into said outlet, a valve for controlling the discharge of steam and oil from said condensing chamber outlet, and means for balancing the head of water in said condensing chamber when it is desired to stop the discharge of oil from said nozzle.

12. A lubricator of the kind described, a casing provided with an oil reservoir provided with a discharge port adjacent the top thereof, and with a discharge nozzle communicating therewith, said port and nozzle so arranged that the oil is balanced, a condensing water chamber in said casing and means for connecting said chamber and reservoir whereby the water is admitted to the oil reservoir to displace the oil contained therein, and the oil discharged from said nozzle under a constant head of water.

13. A lubricator of the kind described, a casing provided with an oil reservoir provided with a discharge port adjacent the top thereof, and with a discharge nozzle communicating therewith, said port and nozzle so arranged that the oil is balanced, a condensing water chamber in said casing and means for connecting said chamber and reservoir whereby the water is admitted to the oil reservoir to displace the oil contained therein, and the oil discharged from said nozzle under a constant head of water, and means for balancing the water in said water chamber to cause the stoppage of the oil discharge, consisting of an auxiliary water chamber connected with said condensing water chamber, and means for controlling the water in said auxiliary water chamber.

14. A lubricator of the kind described, a casing provided with an oil reservoir provided with a discharge port adjacent the top thereof, and with a discharge nozzle communicating therewith, said port and nozzle so arranged that the oil is balanced, a condensing water chamber in said casing and means for connecting said chamber and reservoir whereby the water is admitted to the oil reservoir to displace the oil contained therein, and the oil discharged from said nozzle under a constant head of water, and means for balancing the water in said water chamber to cause the stoppage of the oil discharge, consisting of an auxiliary water chamber connected with said condensing water chamber, and means for controlling the water in said auxiliary water chamber, and means for controlling the admission of steam to said auxiliary water chamber when the water is admitted therefrom to balance the water in the condensing water chamber.

15. In a lubricator of the kind described comprising chambered parts constructed to provide an oil chamber, a condensing chamber arranged thereabove and communicating therewith, an expansion chamber arranged below the top of the oil chamber, and provided with an outlet from said condensing chamber, and an oil outlet from said oil reservoir communicating with said condensing chamber outlet, a nozzle in said oil outlet arranged substantially in alinement with the top of the oil reservoir, said condensing chamber communicating at the top with said water chamber, a valve arranged to prevent the passage of water thereat from the water chamber to the condensing chamber, said water chamber provided with a port, an oil and steam discharge pipe and water admission pipe, and means for controlling the passage of steam and oil through said discharge pipe and the passage of water through said water pipe to said port and water from said water chamber into said condensing chamber, when the passage of oil and steam is prevented.

16. In a lubricator of the kind described and in combination, a casing provided with an oil reservoir, a condensing chamber having a steam inlet and outlet and communicating with said oil reservoir, and an auxiliary water chamber, said oil reservoir having an outlet connected with said steam outlet, said auxiliary water chamber having a valved steam inlet communicating with said condensing chamber, and a water passage extending from the same, said casing provided with a chamber connected with said steam outlet and said water passage and with a steam and oil discharge port, and having an inlet for the admission of water at boiler pressure, and means for controlling the discharge of steam and oil from said discharge port and the admission of water through said inlet, whereby when the steam and oil are discharged water is admitted to and boiler pressure obtained in said auxiliary water chamber and when the discharge of steam and oil through said discharge port is prevented, water from said auxiliary water chamber is free to flow into the condensing chamber and steam from the condensing chamber into the auxiliary water chamber and the water is balanced in the chambers and passages, said means comprising a valve and means for controlling said valve.

17. In a lubricator of the kind described and in combination, a casing provided with an oil reservoir, an expansion chamber communicating therewith, a condensing chamber having a steam inlet and outlet and communicating with said oil reservoir, and an auxiliary water chamber, said oil reservoir having an outlet connected with said steam outlet, said auxiliary water chamber having a valved steam inlet communicating with said condensing chamber, and a water passage extending from the same, said casing provided with a chamber connected with said steam outlet and said water passage and with a steam and oil discharge port, and having an inlet for the admission of water at boiler pressure, and means for controlling the discharge of steam and oil from said discharge port and the admission of water through said inlet, whereby when the steam and oil are discharged water is admitted to and boiler pressure obtained in said auxiliary water chamber and when the discharge of steam and oil through said discharge port is prevented, water from said auxiliary water chamber is free to flow into the condensing chamber and steam from the condensing chamber into the auxiliary water chamber and the water is balanced in the chambers and passages, said means comprising a valve and pressure operated means for controlling said valve.

18. In a lubricator of the kind described and in combination, a casing provided with an oil reservoir and with a chamber at one side thereof, an oil conductor having its inlet end in the oil reservoir adjacent the top thereof, and its outlet end in said adjacent chamber and provided with a nozzle in said chamber with the outlet thereof substantially in alinement with the top of the reservoir and the inlet end of said conductor in said reservoir, said casing provided with a condensing chamber above the reservoir having a steam inlet near the top thereof and provided with its steam outlet substantially in alinement with said inlet, and means for conducting condensing water from said chamber to a point adjacent the bottom of the oil reservoir and thence upwardly to adjacent the top of the reservoir, said casing provided with an auxiliary water chamber adjacent said condensing chamber, a check valve arranged between said condensing and water chambers adjacent the top thereof for preventing the passage of fluid from the water chamber to the condensing chamber, said casing provided with an outlet for said water chamber, a water feed pipe operatively communicating with said outlet, and means for controlling the passage of water between said water pipe to said outlet from said water chamber and between said outlet from said water chamber to the steam outlet of said condensing chamber.

19. In a lubricator of the kind described and in combination, a casing provided with an oil reservoir and with a chamber at one side thereof, an oil conductor having its inlet end in the oil reservoir adjacent the top thereof, and its outlet end in said adjacent chamber and provided with a nozzle in said chamber with the outlet thereof substantially in alinement with the top of the reservoir and the inlet end of said conductor in said reservoir, a valve arranged to control the discharge of oil through said nozzle, said casing provided with a condensing chamber above the reservoir having a steam inlet near the top thereof and provided with its steam outlet substantially in alinement with said inlet, said condensing chamber provided with a discharge opening in the bottom communicating with the oil reservoir, and means connected with said opening for conducting the condensing water into the oil reservoir below the top thereof and thence discharge the same substantially at the top, said casing provided with an auxiliary water chamber adjacent said condensing chamber, a check valve arranged between said condensing and water chambers adjacent the top thereof for preventing the passage of fluid from the water chamber to the condensing chamber, said casing provided with an outlet for said water chamber, a water feed pipe operatively communicating with said outlet, and means for controlling the passage of water between said water pipe to said outlet from said water chamber and between said outlet from said water chamber to the steam outlet of said condensing chamber.

20. In a lubricator of the kind described and in combination, a casing provided with an oil reservoir and with a chamber at one side thereof, an oil conductor having its inlet end in the oil reservoir adjacent the top thereof, and its outlet end in said adjacent chamber and provided with a nozzle in said chamber with the outlet thereof substantially in alinement with the top of the reservoir and the inlet end of said conductor in said reservoir, said casing provided with a condensing chamber above the reservoir having a steam inlet near the top thereof and provided with its steam outlet substantially in alinement with said inlet, said condensing chamber provided with a discharge opening in the bottom communicating with the oil reservoir, and means connected with said opening for conducting the condensing water into the oil reservoir below the top thereof and thence discharge the same substantially at the top, means for controlling the passage of water through said conducting means, said casing provided with an auxiliary water chamber adjacent said condensing chamber, a check valve arranged between said condensing and water chambers adjacent the top thereof for preventing the passage of fluid from the water chamber to the condensing chamber, said casing provided with an outlet for said water chamber, a water feed pipe operatively communicating with said outlet, and means for controlling the passage of water between said water pipe to said outlet from said water chamber and between said outlet from said water chamber to the steam outlet of said condensing chamber.

21. In a lubricator of the kind described and in combination, a casing provided with an oil reservoir and with a chamber at one side thereof, an oil conductor having its inlet end in the oil reservoir adjacent the top thereof, and its outlet end in said adjacent chamber and provided with a nozzle in said chamber with the outlet thereof substantially in alinement with the top of the reservoir and the inlet end of said conductor in said reservoir, said casing provided with a condensing chamber above the reservoir having a steam inlet near the top thereof and provided with its steam outlet substantially in alinement with said inlet, and means connected with said duct for conducting and condensing water into the oil reservoir below the top of the contained oil thereof and thence discharge the same substantially at the top.

22. In a lubricator of the kind described and in combination, a casing provided with an oil reservoir and with a chamber at one side thereof, an oil conductor having its inlet end in the oil reservoir adjacent the top thereof, and its outlet end in said adjacent chamber and provided with a nozzle in said chamber with the outlet thereof substantially in alinement with the top of the reservoir and the inlet end of said conductor in said reservoir, a valve arranged to control the discharge of oil through said nozzle, said casing provided with a condensing chamber above the reservoir having a steam inlet near the top thereof and provided with its steam outlet substantially in alinement with said inlet, and means for conducting condensing water from said chamber to a point adjacent the bottom of the oil reservoir and thence upwardly to adjacent the top of the reservoir.

23. In a hydrostatic lubricator of the kind described and in combination, a casing provided with associated chambers constituting a condensing chamber, an oil reservoir and expansion chamber, a water chamber and a sight chamber, and means for controlling the passage of steam, water and oil from said associated chambers.

24. In a hydrostatic lubricator of the kind described and in combination, a casing provided with associated chambers constituting a condensing chamber, an oil reservoir and expansion chamber, a water chamber and a sight chamber, and means for controlling the passage of steam, water and oil from said condensing chamber and oil reservoir and the admission of water from said water chamber to said condensing chamber comprising a valve.

25. In a hydrostatic lubricator of the kind described and in combination, a casing provided with associated chambers constituting a condensing chamber, an oil reservoir and expansion chamber, a water chamber and a sight chamber, and means for controlling the passage of steam, water and oil from said condensing chamber and oil reservoir and the admission of water from said water chamber to said condensing chamber comprising a valve and means for controlling said valve.

26. In a hydrostatic lubricator of the kind described and in combination, a casing provided with associated chambers constituting a condensing chamber, an oil reservoir and expansion chamber, a water chamber and a sight chamber, and means for controlling the passage of steam, water and oil from said condensing chamber and oil reservoir and the admission of water from said water chamber to said condensing chamber comprising a valve and a pressure controlled plunger for operating said valve.

27. In a lubricator of the kind described, suitable chambered parts constructed to provide an oil reservoir, a condensing chamber and a water chamber, said parts provided with communicating ducts between said chambers, and with a steam inlet to the condensing chamber and a water inlet to the water chamber, whereby water at boiler pressure may be admitted to said chamber, said parts provided with oil and steam outlets, said ducts and outlets so disposed as to provide a balanced head of water and oil in the oil reservoir and permit the balancing of the head of water in the condensing chamber with the water in said water chamber.

28. In a lubricator of the kind described and in combination, suitable chambered parts constructed to provide an oil reservoir and a condensing chamber with means for conducting water from the condensing chamber to said oil reservoir, said chambered parts provided with a steam inlet to said condensing chamber and a steam outlet therefrom, and with an outlet from said oil reservoir communicating with said steam outlet, said inlet, outlets and conducting means so disposed that variable heads of water and oil in the oil reservoir are not effective on the passage of oil through said outlet, whereby the oil is discharged only under the head of water in the condensing chamber.

In testimony whereof, I have hereunto signed my name in the presence of two subscribing witneseses.

ARTHUR C. BECKWITH.

Witnesses:
 Roy W. Hill,
 Charles I. Cobb.